(12) United States Patent
Kare

(10) Patent No.: US 6,175,326 B1
(45) Date of Patent: Jan. 16, 2001

(54) MOVING RECEIVE BEAM METHOD AND APPARATUS FOR SYNTHETIC APERTURE RADAR

(75) Inventor: Jordin T. Kare, San Ramon, CA (US)

(73) Assignee: The Regents of the University of California, Oakland, CA (US)

( * ) Notice: Under 35 U.S.C. 154(b), the term of this patent shall be extended for 0 days.

(21) Appl. No.: 09/106,406

(22) Filed: Jun. 29, 1998

(51) Int. Cl.$^7$ ................................................. G01S 13/90
(52) U.S. Cl. ................................................. 342/25; 342/157
(58) Field of Search ............................ 342/25, 371, 157; 367/123

(56) References Cited

U.S. PATENT DOCUMENTS 4,253,098 * 2/1981 Blythe ...................................... 342/25
5,278,757 * 1/1994 Hoctor et al. ...................... 364/413.25

* cited by examiner

Primary Examiner—Ian J. Lobo
(74) Attorney, Agent, or Firm—Alan H. Thompson

(57) ABSTRACT

A method and apparatus for improving the performance of Synthetic Aperture Radar (SAR) systems by reducing the effect of "edge losses" associated with nonuniform receiver antenna gain. By moving the receiver antenna pattern in synchrony with the apparent motion of the transmitted pulse along the ground, the maximum available receiver antenna gain can be used at all times. Also, the receiver antenna gain for range-ambiguous return signals may be reduced, in some cases, by a large factor. The beam motion can be implemented by real-time adjustment of phase shifters in an electronically-steered phased-array antenna or by electronic switching of feed horns in a reflector antenna system.

17 Claims, 3 Drawing Sheets

MOVING RECEIVE BEAM METHOD AND APPARATUS FOR SYNTHETIC APERTURE RADAR

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to radar systems, particularly to Synthetic Aperture Radar (SAR) systems, and more particularly to a method and apparatus for improving the performance of SAR systems by (a) reducing the effect of "edge losses" associated with nonuniform receiver antenna gain, and (b) reducing "range ambiguity" (undesired radar returns from pulses preceding and following the pulse producing the desired return).

Over the years various radar systems have been developed for different applications. One such radar system now under development at the Lawrence Livermore National Laboratory (LLNL) is the satellite-based SAR system being developed primarily for military, strategic, or earth/environmental resource applications. The SAR system being designed at LLNL is being developed as part of the Tactical Imaging Constellation Architecture Study SAR (CAS/SAR). The TICAS/SAR design requirements included collecting high resolution SAR imagery over a wide target area, with specified signal-to-noise ratio and "multiplicative noise ratio" or MNR. Among the factors that must be included in such a design are "edge losses," generally defined as the reduction in performance at the edge of the useful portion of the radar beam compared to the performance at the center of the beam. Edge losses occur on both transmission and reception. It is possible to make edge losses arbitrarily small by creating a "top hat" antenna pattern with uniform transmit gain and/or receive sensitivity over a range of angles, but this makes very inefficient use of the antenna area. Conventional design practice generally results in edge losses of approximately −3 db (a factor of two in power) in transmit and the same in receive, or −6 dB (a factor of four) two-way. Thus, in order to meet specifications at the edge of the radar beam, up to four times as much power must be transmitted as would be needed to meet specifications at the center of the beam. Edge losses occur in both azimuth (along-track) and elevation (cross-track) directions.

Another key factor in the design of a SAR is the strength of ambiguous returns (the "ambiguity level"), which contributes to and often determines the MNR and the quality of the SAR image. Ambiguous returns result from detecting undesired signals which cannot be distinguished from desired signals. Range-ambiguous signals come from pulses occurring immediately before or after the desired pulse. When the desired signal is being received from the target at range R, the ambiguous signals come from ranges R±c/(2*PRF), where PRF is the Pulse Repetition Frequency. Because the SAR beam is not in the plane of the target but intersects it at an angle (the "grazing angle"), these ambiguous returns are displaced in elevation from the desired return and are suppressed by the directionality of the transmitting and receiving antennas. In some types of SARs (including the LLNL TICAS design) the transmitter must illuminate an area substantially larger than the receiver antenna beam width; in this case, the range-ambiguous responses are attenuated only by the receive antenna pattern.

Reducing or eliminating edge losses in the elevation direction, even in the receive mode only, can reduce the required SAR power by up to 3 dB. Reducing range ambiguities allows either improved image quality or a higher PRF.

The present invention provides a method and apparatus for improving the performance of the SAR system by reducing the effect of "edge losses" associated with nonuniform receiver antenna gain. By moving the receiver antenna pattern, such as by electronic steering, in synchrony with the apparent motion of the transmitted pulse along the ground, the maximum available receiver antenna gain can be used at all times. If the receiver antenna pattern is moved in synchrony with the apparent motion of the preceding and following pulses, the receiver antenna gain for ambiguous signals can be minimized. Both of these benefits are realized simultaneously, although optimizing the beam position for maximum gain may not yield the maximum reaction in ambiguity, and vice versa. The moving or steering of the receiver antenna pattern can be either continuous or in the form of two or more discrete steps. The steering can be implemented in several ways.

SUMMARY OF THE INVENTION

It is an object of the present invention to improve the performance of Synthetic Aperture Radar systems.

A further object of the invention is to reduce or eliminate the effect of edge losses associated with nonuniform receiver antenna gain.

A further object of the invention is to reduce the amplitude of range-ambiguous signals received by a SAR system.

A further object of the invention is to provide a method and apparatus for moving the receiver antenna pattern to obtain the maximum available receive antenna gain and/or to minimize the receive antenna gain for range-ambiguous signals.

Another object of the invention is to provide a method and apparatus which involves a receive antenna which can be electronically steered in the elevation direction over an angle equal to the angular width of the useful part of the transmitted beam.

Another object of the invention is to provide a method and apparatus for electronically steering a receive antenna, plus providing appropriate timing and synchronizing circuitry such that the center of the receiving antenna pattern is moved in synchrony with the apparent position of the illuminated portion of the target area.

Another object of the invention is to provide steering of the receive antenna by continuous rapid adjustment of the phase shift or time delay networks of a phased array antenna.

Another object of the invention is to provide steering of the receive antenna by rapidly switching among several fixed phase shift or time delay networks, or fixed ports on a single delay network, connected to a phased array antenna.

Another object of the invention is to provide steering of the receive antenna by rapidly switching among several closely-spaced fixed feed horns for a reflector antenna or space-fed phased array.

Another object of the invention is to provide steering of the receive antenna by rapid mechanical motion of a reflector or other beam-steering component.

Another object of the invention is to provide a method and apparatus for improving the performance of SAR systems by moving the receiver antenna pattern in synchrony with the apparent motion of the transmitted pulse along the ground, so that the maximum available receiver antenna gain can be used at all times.

Other objects and advantages of the present invention will become apparent from the following description and accompanying drawings. Basically, the invention involves a moving receiver beam technique for SAR systems. The invention is directed to a method and apparatus for improving the performance of SAR systems by reducing the effect of "edge losses" associated with nonuniform receiver gain. The method and apparatus of this invention is accomplished through moving the receiver antenna pattern in synchrony with the apparent motion of the transmitted pulse along the ground, whereby the maximum available receiver antenna gain can be used at all times. The invention involves moving a receive antenna by electronically steering it in the elevation direction over an angle equal to the angular width of the useful part of the transmitted beam. Also, the invention involves appropriate timing and synchronizing circuitry such that the center of the receiving antenna pattern is moved in synchrony with the apparent position of the illuminated portion of the target area. The beam movement can be implemented, for example, by real-time adjustment of phase shifters in an electronically-steered phased-array antenna, or by electronic switching of feed horns in a reflector antenna system. Also, by use of the invention, the receiver antenna gain for range-ambiguous return signals may be reduced in some cases by a large factor.

The invention can be utilized to improve the performance of existing and future SAR systems intended, for example, for military, strategic, or earth/environmental resource applications, or for imaging, such as for news gathering and resource exploration/management.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1A:
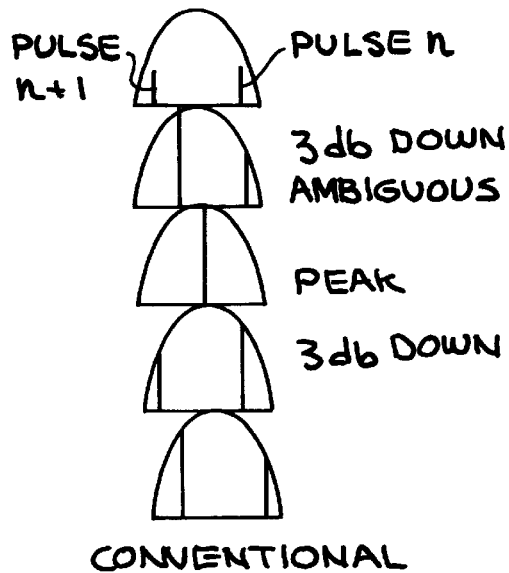
FIGS. 1A and 1B schematically illustrate the differences between a conventional SAR (FIG. 1A) and an LLNL-TICAS/SAR (FIG. 1B) incorporating the method and apparatus of the present invention.

The present invention involves a method or apparatus for improving performance of SAR systems for reducing the effect of "edge losses" associated with nonuniform receiver antenna gain. By moving the receiver antenna pattern in synchrony with the apparent motion of the transmitted pulse along the ground, the maximum available receiver antenna gain can be used at all times. Also, the receiver antenna gain for range-ambiguous return signals may be reduced, in some cases by a large factor. Broadly, the invention involves the implementation of beam motion, for example, by real-time adjustments of phase shifters in an electronically-steered phase-array antenna or by electronic switching of feed horns in a reflector antenna system. More specifically, the invention comprises a receive antenna which can be electronically steered in the elevation direction over an angle equal to the angular width of the useful part of the transmitted beam, plus appropriate timing and synchronizing circuitry such that the center (maximum gain) of the receiving antenna pattern is moved in synchrony with the apparent position of the illuminated portion of the target area. The steering can be either continuous or in the form of two or more discrete steps. The following sets forth ways in which the steering can be implemented:

1. By continuous rapid adjustment of the phase shift or time delay networks of a phased array antenna.

2. By rapidly switching among several fixed phase shift or time delay networks.

3. By rapidly switching among several fixed ports on a single delay network, such as a Blass feed system, connected to a phased array antenna.

4. By rapidly switching among several closely-spaced fixed feed horns for a reflector antenna or space-fed phased array.

5. By rapid mechanical motion of a reflector or other beam-steering component.

In a conventional SAR, the receive beam(s) are co-aligned to the transmitted beam(s). The antenna gain is maximum at the center of each beam and falls off away from the center. The edge of the beam is defined by the SAR designer but is typically the point at which the antenna gain falls by 3 dB. Points near the edge of a beam are thus subject to "edge losses" of 3 dB in transmit and another 3 dB in receive, for a total of 6 dB. Edge losses occur in both range and azimuth directions; in the extreme case in which full performance must be maintained over a square target area, up to 12 dB of system performance may be lost at the corners of the square.

In the LLNL TICAS/SAR, the transmitted pulse is short compared to the target width W/2c (c is the speed of light), so only a narrow strip of the target is illuminated at any instant. Without the use of the present invention, as the strip illuminated by a particular pulse moves across the ground, it moves across both the transmit and receive beam profiles, incurring edge losses in both transmit and receive paths. In addition, the ambiguous pulses are also moving; i.e., as the current desired pulse N approaches the "far" edge of the receive beam, the next pulse N+1 is getting closer to the "near" edge. The spacing between pulses (and thus the maximum pulse repetition frequency, $PRF_{max}$) must be adjusted so that even in the worst case, the ambiguous signal will not exceed some specified level.

However, with the present invention using a phased array, it is possible to move the receive beam in real time by rapidly varying the phase shifts so that the peak of the received beam is always right on top of the instantaneous "bright spot" on the ground, as seen from the receiver. The desired signal is thus always received with maximum gain. The receive beam is also thus centered between the two nearest ambiguous pulses, minimizing the return from them; the receive profile "runs away from" the ambiguous returns at the same time that it "runs along with" the desired return.

For a fixed PRF, this can drastically reduce the ambiguous signal strength, since the slope of the receive beam skirt is quite steep; alternatively, the PRF can be raised significantly for a given ambiguity level.

Figure 1B:
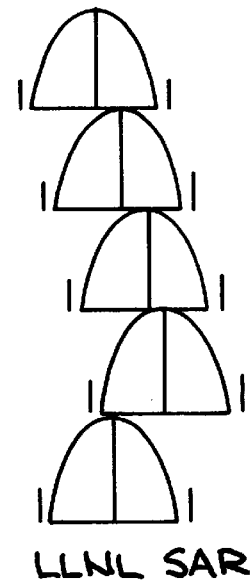

FIG. 1A illustrates a conventional SAR as described above where the receive beam(s) are co-aligned to the transmitted beam(s). FIG. 1B illustrates the LLNL SAR incorporating the present invention. A comparison of these figures illustrates the advantages of the present invention.

This approach fails at high grazing angles and/or with long pulses. Under these conditions, the entire target area is illuminated for at least part of the pulse and there is little benefit to moving the receive beam. To first order, the technique is useful when $$t_{pulse} < W \cos\theta \, g/2c$$

where W is the target width.

It is possible to make the receive antenna beam position a function of frequency, either varying continuously or in discrete steps for two or more frequency bands. This would allow SAR systems using a chirped pulse (in which the transmitted frequency is a function of time) to make use of the current invention, even with pulses much longer than the value given above.

Also, under some conditions, particularly at high grazing angles, it is desirable to deliberately "spoil" or broaden the transmitted beam to increase the target width W, which can be illuminated. Without the current invention, the receive beam must also be spoiled by the same amount as the transmitted beam, resulting in a decrease in receive antenna gain approximately equal to the ratio of the spoiled beam width to the unspoiled width. In this case, the current invention is especially useful, since the receive beam can be left unspoiled and moved across the wider transmitted beam, avoiding this loss.

A moving beam, as pointed out above, can be produced by updating the phase shifters in a phased array at several times the PRF. There are various ways to do this with minimum disruption of signal, including:

1. Using fast RF switches in the phase shifters themselves;
2. Using two sets of phase shifters and a single fast RF switch in each T/R module or set of T/R modules to select between them, allowing the "idle" set to be updated relatively slowly; and
3. "Sweeping" the phase shift across the array, altering, for example, one row at a time. This will smoothly vary the beam shape from its initial position through a series of intermediate (and slightly wider) beams to the final position, while introducing no abrupt variations in the received signal.

A moving beam can also be simulated by using two or more overlapping fixed beams and switching between them as the "bright spot" crosses the field of view. This can be conveniently implemented in a phased array system using a Blass-type time-delay feed system, which readily generates multiple fixed beams as multiple taps on the delay line assembly. It can also be implemented in reflector-antenna system by using multiple feeds. A reasonable configuration for the LLNL SAR would use four beam positions within each nominal receive beam. This would leave <<1 dB variation in gain between the center of each beam position and the crossover point between two beam positions.

The timing of the moving beam can be done either open- or closed-loop. An open-loop system would move the beam position at a calculated rate based on the range to target and grazing angle only. A closed-loop system would in some fashion measure and maximize the received signal amplitude. This would be comparatively easy in a phased-array system using a Blass or similar feed, since the signals from all possible beam positions are available simultaneously. A comparatively simple receiver circuit could measure the mean signal in each possible beam position and switch the main receiver and digitizer to the beam with the strongest signal.

It is also possible to use one or more test pulses at the beginning of a SAR collection to measure the exact timing of the returned signal prior to actually collecting data. This would allow initial setting of either open or-closed-loop systems.

The required update or switching times are of order 10 microseconds for the TICAS/SAR and are well within the state of the art for the number of elements and beam positions involved.

Figure 2:
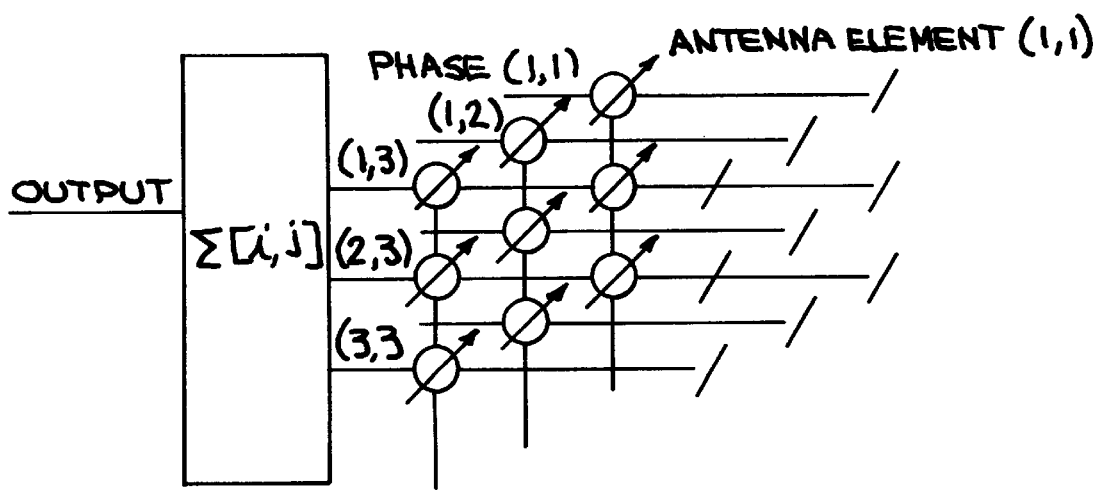
FIG. 2 schematically illustrates a moving receiver beam configuration using a phased array with individual phase shifters or time delay elements.
Figure 3:
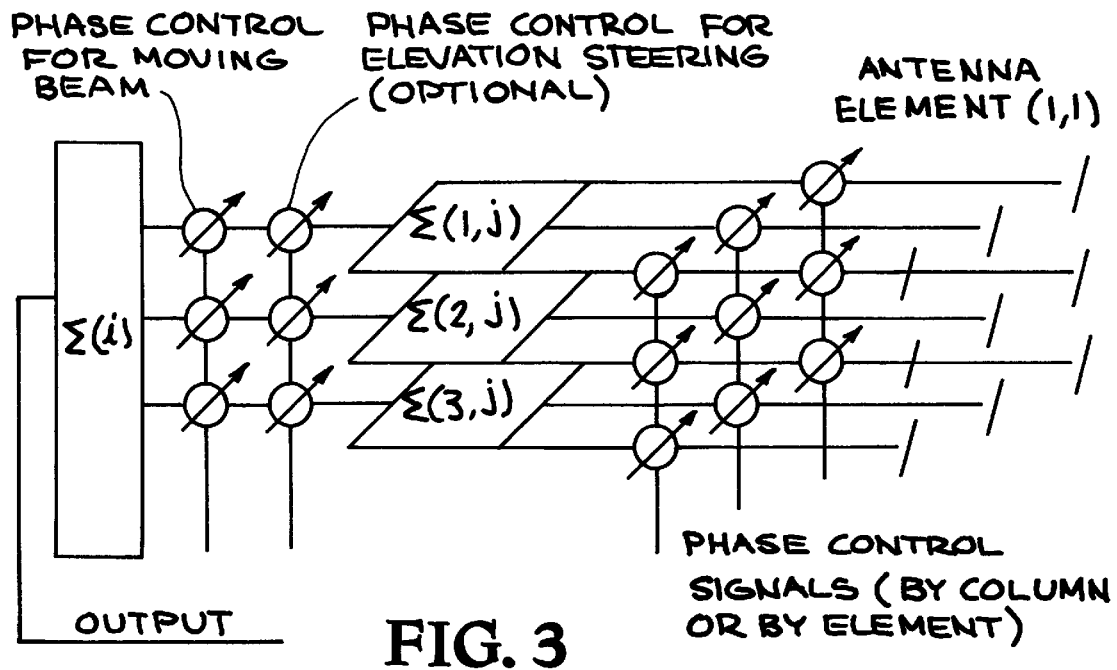
FIG. 3 schematically illustrates another moving receiver beam configuration using a phased array with common row phase shifters or time delays.

Referring now to the moving receive beam configurations schematically illustrated in FIGS. 2–7, the FIG. 2 embodiment illustrates a phased array with individual variable phase shifters or time delays and illustrating phase control signals by element. In FIG. 2, continuous adjustment and discrete steps are carried out as follows:

Continuous adjustment: Phase $[i,j](t) = i^* \Delta row + j^* (\Delta col + f_{moving}*(t-t0))$ Discrete steps: Phase $[i,j](t_n) = i^* \Delta row + j^* (\Delta col + \Delta moving^*(n))$ where tn is any time between $t0+n\Delta t$ and $t0+(n+1)\Delta t$
$\Delta row$=row-to-row phase shift for beam steering
$\Delta col$=column-to-column phase shift for beam steering
$f_{moving}$=phase shift rate for continuously moving beam
$\Delta moving$=phase shift step for discretely moving beam The FIG. 3 embodiment illustrates a phased array with common row phase shifters or time delays and illustrates, by legend, phase control for moving beam, phase control for elevation steering (optional), and phase control signals (by column or by element). Phase control for elevation steering can be combined with phase control for moving beam or kept separate; generally, the steering control needs a much wider range than for the moving beam control; steering may also require true time delays rather than phase shifters. Elevation steering may also be done via control of the individual elements, rather than by rows.

Figure 4:
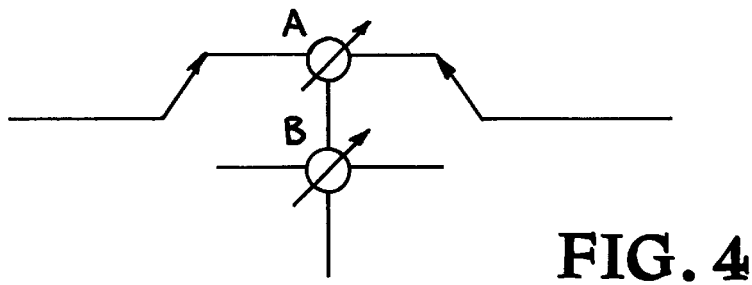
FIG. 4 illustrates schematically fast phase shifting using two phase shifters.

Fast phase shifting can be implemented using two phase shifters as shown in FIG. 4. One is updated to new phase settings while the other is in use. Switching can be via two-position switches (PIN or FET or micromechanical) or via variable attenuators to allow a smooth continuous shift from phase shifter A to phase shifter B, as shown. For phased arrays, the beam can be smoothly shifted from one discrete position to another by switching the moving-beam phase shift for one row at a time, progressively from top to bottom or bottom to top of the array. This will introduce a slight broadening of the beam while it is moved but will reduce the effect of switching transients and abrupt gain/phase variations.

Figure 5:
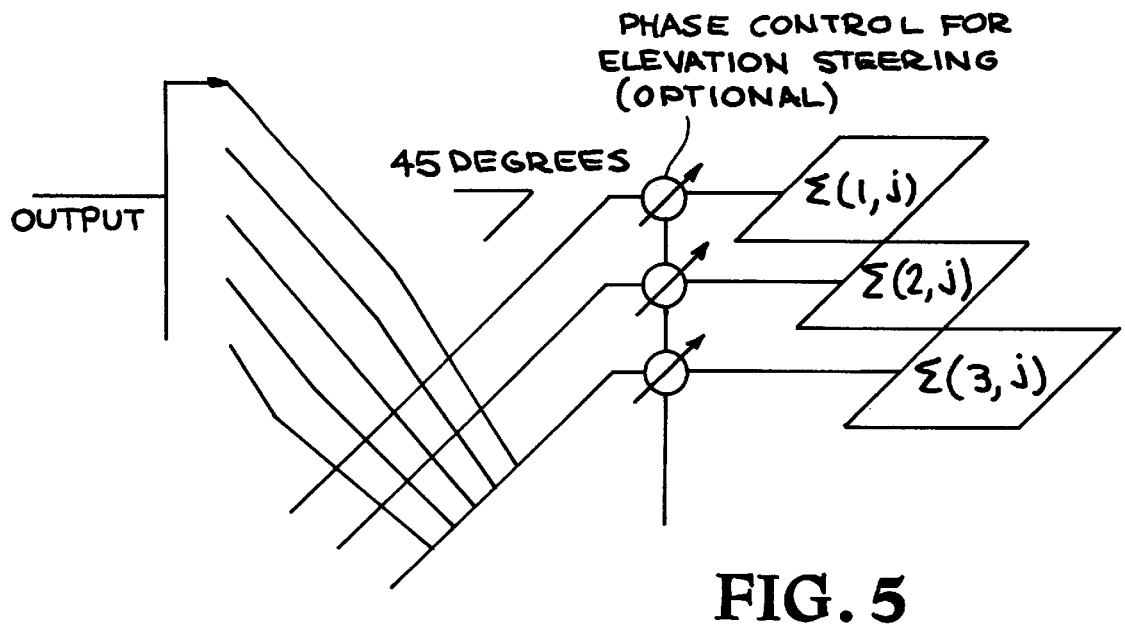
FIG. 5 schematically illustrates another moving receiver beam configuration using a phased array with multiple-tapped beam forming network.

FIG. 5 illustrates a phased array with multiple-tapped beam forming network involving, as shown by legends, the moving beam position and phase control for elevation steering (optional). As seen in FIG. 5, selectable delay network (Blass line with five taps shown) provides several fixed beam offsets for moving beam position. A Blass line uses two sets of straight delay lines oriented roughly 90 degrees to each other and 45 degrees to the phased array plane. For an exact 90 degree intersection, the distance-and thus the delay-from any row on the phased array to a particular output is constant.

Figure 6:
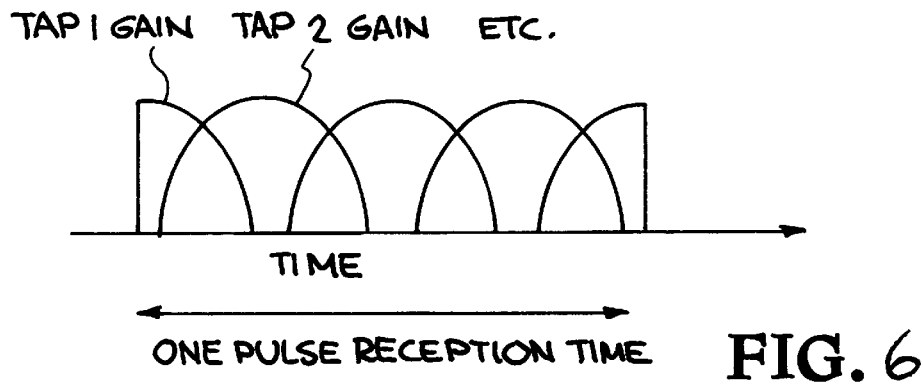
FIG. 6 illustrates schematically matching delay for each switch, not shown.

Matching delay lines for each switch, not shown, would keep the total receive time delay constant independent of switch position. Selection switch can be either a discrete switch or a set of variable attenuators allowing continuous transition between adjacent delay positions, as shown in FIG. 6.

Figure 7:
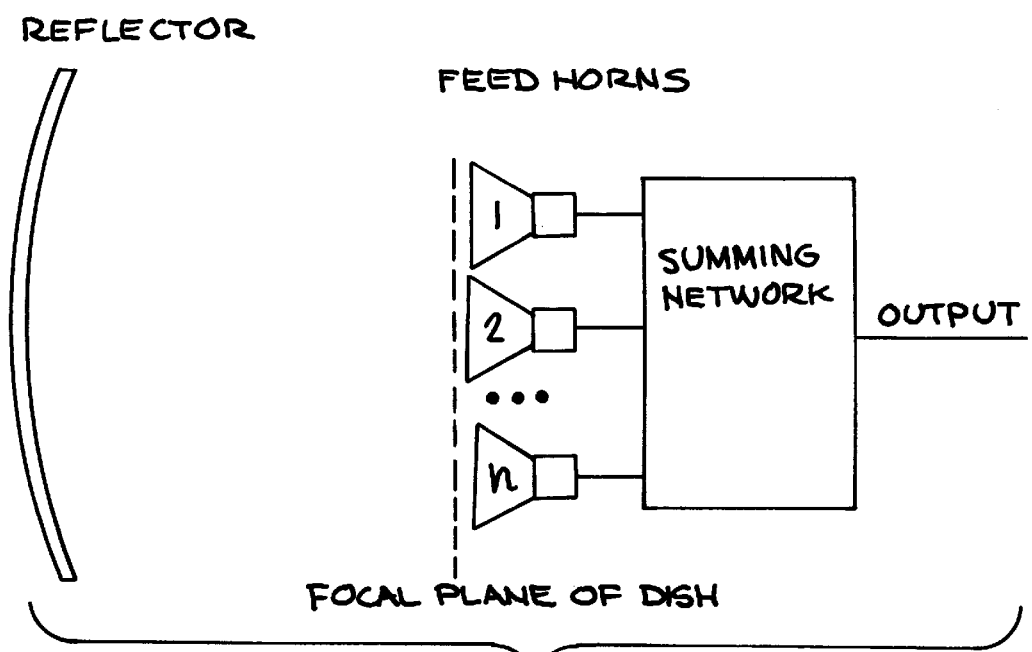
FIG. 7 schematically illustrates another moving receiver beam configuration using a reflector antenna with multiple feeds.

The FIG. 7 embodiment illustrates a moving receive beam configuration utilizing a reflector antenna with multiple feeds. As seen in FIG. 7, the reflector, indicated by legend, is not to scale and is actually much larger and farther away from the feed horns, indicated by legend, located at the focal plane of the reflector dish, and which are operatively connected to a summing network. Table I shows the summing network gain factors using three of five feeds.

TABLE I

| Time* | Gain 1 | Gain 2 | Gain 3 | Gain 4 | Gain 5 |
|---|---|---|---|---|---|
| 0 | 1/3 | 1/3 | 1/3 | 0 | 0 |
| 1/3 | 0 | 1/3 | 1/3 | 1/3 | 0 |
| 1/3 | 0 | 0 | 1/3 | 1/3 | 1/3 |

(*fraction of received pulse width)

Normally, m of n feeds are summed, where m feeds have approximately the radiating area and gain of a single non-moving-beam feed and $(n/m)-1$ is the number of beam widths of motion needed.

Individual feed horns are smaller (in the elevation direction) than a conventional single feed. The summing network can use discrete-position switches or variable attenuators, as in selectable-feed phased array. Other feed designs, besides horns, can be used as well. Number and size of feeds will depend on detailed design configuration and allowable noise pickup; as few as three feeds. Two feeds can also work with appropriate feed design and variable attentuation, with typical weightings (e.g., as shown in Table II):

TABLE II

| Time | A Feed Gain | B Feed Gain |
|---|---|---|
| 0 | 1 | 0 |
| 0.5 | 0.5 | 0.5 |
| 1 | 0 | 1 |

However, with only two feeds, Performance may be poor (i.e., either single feed is lossy at t=0 and t=1, or two feeds are too "wide" and pick up excess noise). A 3-of-n feed would be a typical practical configuration.

Note that the FIG. 7 configuration, with the feeds located at the reflector focal plane, is not a phased array feed; the beam position is varied by varying (electronically) the effective position of the feed. The feeds may need to be located on a curved surface, or have fixed phase or time delay corrections, to match the focal properties of the reflector. A phased array feed would be located some distance from the reflector focal plane, toward or away from the reflector, and would change the "pointing" of the feed by phase variations across the feed assembly, rather than location of the feed. However, a phased array feed/reflector configuration is also suitable for creating the moving receive beam.

The technique of selecting among multiple feed horns is also applicable to an antenna system which uses a lens rather than a reflector to form a collimated beam. The technique is also applicable to antenna systems using a space-fed phased array, in which the phased array acts as a lens or reflector with additional properties such as gain or electronic steering.

It has thus been shown that the present invention improves the performance of SAR systems by reducing the effect of "edge losses" associated with nonuniform receiver antenna gain, by moving the receiver antenna pattern in synchrony with the apparent motion of the transmitted pulse along the ground. The method and apparatus of this invention allows up to a 3 dB improvement in the system. It also allows a large improvement in range ambiguity levels and/or a significant (potentially up to two-fold) increase in $PRF_{max}$. The invention can be implemented with modest hardware overhead in a SAR using a phased array; it may be possible to implement even in systems using reflector antennas. It does provide maximum benefit for systems using pulses short compared to the pulse travel time across the target region.

While particular embodiments of the apparatus and method, along with parameters, etc., have been described and/or illustrated, such are not intended to be limiting. Modifications and changes may become apparent to those skilled in the art, and it is intended that the invention be limited only by the scope of the appended claims.

What is claimed is:

1. In a Synthetic Aperture Radar the improvement comprising;

a receiver antenna having a receiver antenna pattern, and means for moving the receiver antenna pattern in synchrony with the apparent motion of the transmitted pulse along the ground thus at least reducing the edge losses associated with nonuniform receiver antenna gain, said means for moving the receiver antenna pattern including means selected from the group consisting of means for real-time adjustment of phase shifters in an electronically-steered phased-array antenna, means for electronic switching of feed horns in a reflector antenna system, and means for electronic switching among two or more fixed delay networks, or fixed ports on a single delay network, connected to a phased array antenna.

2. A method for improving the performance of Synthetic Aperture Radar systems comprising:

providing a receiver antenna pattern, and moving the receiver antenna pattern in synchrony with apparent motion of the transmitted pulse along the ground thus at least reducing the effect of edge losses associated with nonuniform receiver antenna gain.

3. The method of claim 2, wherein moving the receiver antenna pattern in synchrony with apparent motion of the transmitted pulse along the ground additionally produces the maximum available receiver antenna gain.

4. The method of claim 2, additionally including adjusting the position of the receiver antenna pattern for reducing the receiver antenna gain for range-ambiguous signals.

5. The method of claim 2, wherein moving the receiver antenna pattern is implemented by real-time adjustment of phase shifters in an electronically-steered phased-array antenna.

6. The method of claim 2, wherein moving the receiver antenna pattern is implemented by electronic switching of feed horns in a reflector antenna system or a spaced-fed phased array.

7. The method of claim 2, wherein moving the receiver antenna pattern is implemented by electronic switching among two or more fixed delay networks, or fixed ports on a single delay network, connected to a phased array antenna.

8. The method of claim 2, wherein moving the receiver antenna pattern is carried out by electronically steering a receive antenna in the elevation direction over an angle equal to the angular width of the useful part of the transmitter beam.

9. The method of claim 8, additionally including providing approximate timing and synchronizing circuitry such that the center of the receiver antenna pattern is moved in synchrony with the apparent position of the illuminated portion of the target area.

10. The method of claim 8, wherein the steering is implemented by continuous rapid adjustment of the phase shift or time delay networks of a phased-array antenna.

11. The method of claim 8, wherein the steering is implemented by rapidly switching among several fixed phase shift or time delay networks.

12. The method of claim 8, wherein the steering is implemented by rapidly switching among several fixed ports on a single delay network connected to a phased array antenna.

13. The method of claim 12, wherein the single delay network comprises a Blass feed system.

14. The method of claim 8, wherein the steering is implemented by switching among several closely-spaced fixed feed horns for a reflector antenna or a space-fed phased array.

15. The method of claim 8, wherein the steering is implemented by rapid mechanical motion of a reflector or other beam-steering component.

16. The method of claim 9, additionally including providing a mechanism for measuring the signal strength at multiple feed networks or multiple ports of a single feed network, and automatically selecting the port which provides maximum instantaneous gain.

17. The method of claim 2, wherein the transmitted signal varies in frequency as a function of time, and the position of the receiver antenna pattern is made a function of the frequency of the received signal, such that the peak of the receiver antenna gain at a particular frequency is aligned with the apparent position of the point on the ground illuminated by the corresponding frequency component of the transmitted pulse.

* * * * *